Nov. 1, 1932.    L. C. WILLEY    1,885,498
BACKSTOP FOR AUTOMOTIVE VEHICLES
Filed March 23, 1931
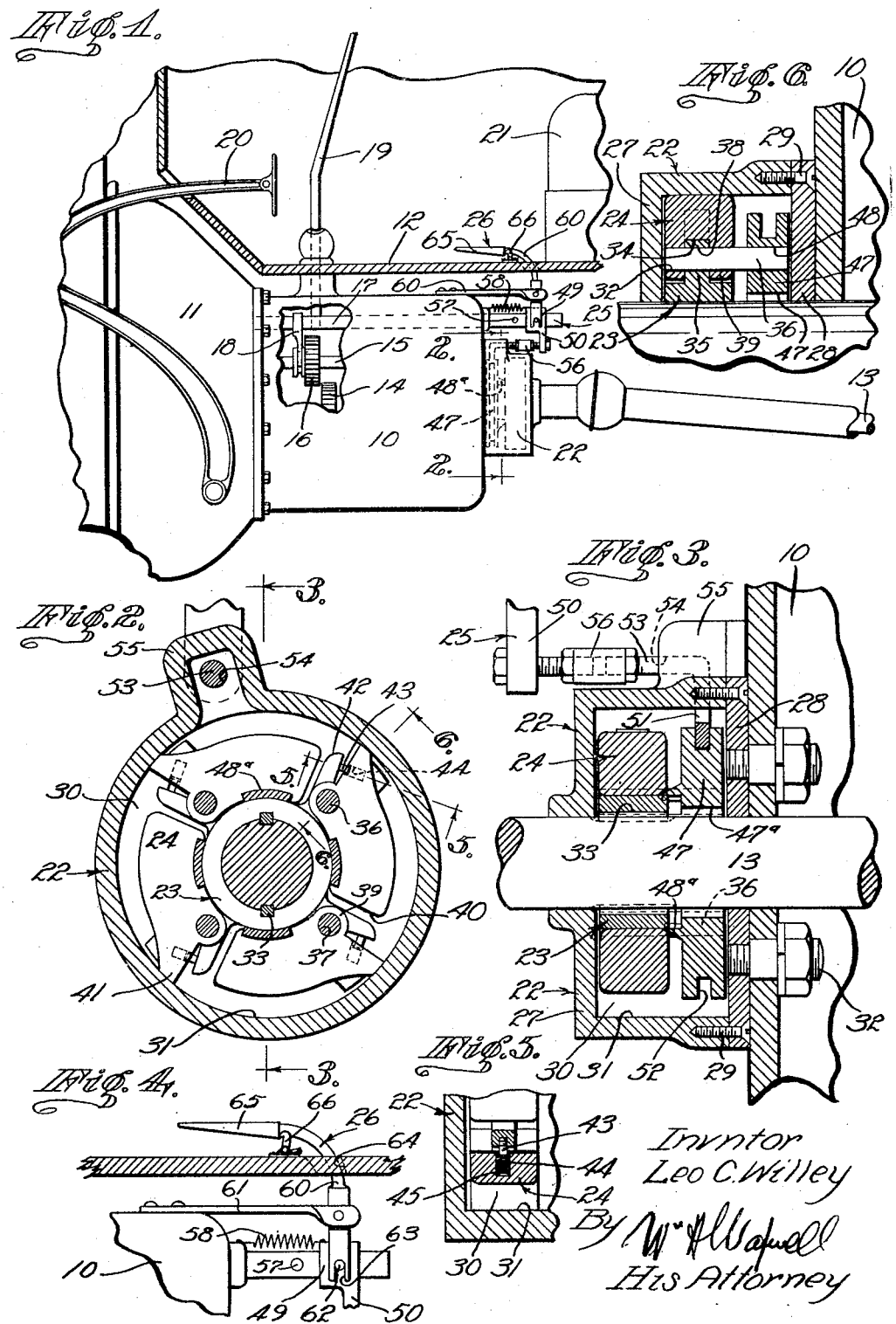
Inventor
Leo C. Willey
By W. H. Wapnell
His Attorney Patented Nov. 1, 1932

1,885,498

UNITED STATES PATENT OFFICE

LEO C. WILLEY, OF GLENDALE, CALIFORNIA, ASSIGNOR OF FIVE PER CENT TO ELSIE MAY KRAMER, OF LOS ANGELES COUNTY, CALIFORNIA

BACKSTOP FOR AUTOMOTIVE VEHICLES

Application filed March 23, 1931. Serial No. 524,594.

This invention relates to a device for use on automotive vehicles, and relates more particularly to a back-stop for preventing rearward movement of an automobile, truck, motorcycle, or the like, when standing on a hill or inclination.

Devices of various characters have been introduced to prevent a standing or recently-stopped automobile or truck from moving backwards down an inclination. The devices for stopping or for preventing undesirable rearward movement of vehicles are commonly termed "hold-backs" or "back-stops" and usually operate independently of the brake mechanisms of the vehicles. The hold-backs or back-stops that have been introduced usually involve steel balls, cams, or the like, that operate or wedge between a part rotating with the drive shaft of the vehicle and a relatively stationary part. In hold-backs or back-stops of the character referred to the balls or cams frictionally engage the rotating part and the relatively stationary part and cause considerable friction, wear, and noise and often stick or jam to cause undesirable jars or shocks to the parts with which they are associated. Further, the common types of back-stops do not come into operation until the vehicle starts rearward, usually depending upon rearward movement of the vehicle for their actuation.

It is a general object of the invention to provide a hold-back or back-stop for an automotive vehicle that is operable to positively prevent rearward movement of the vehicle when standing on an inclination.

Another object of the invention is to provide a back-stop of the character mentioned that operates smoothly and positively and without noise or grabbing. The device provided by this invention automatically comes into operation to prevent rearward movement of the vehicle before such movement is started so that it does not cause shocks or jarring action due to the sudden stopping of the rearward motion of the vehicle.

It is another object of the invention to provide a back-stop of the character mentioned that includes an automatic control related to the reverse gear of the transmission of the vehicle that operates to automatically release the device and make it operative upon the reverse gear of the vehicle transmission being shifted into operation or upon the gear shift lever being operated to position to provide for the rearward drive of the vehicle.

It is another object of the invention to provide a back-stop of the character mentioned that includes a manual control whereby it may be manually released or made inoperative.

A further object of the invention is to provide a hold-back or back-stop for automotive vehicles that is simple and inexpensive of manufacture and that is capable of embodiment in forms for use on various classes of vehicles.

Other objects and features of my invention will be best and more fully understood from the following detailed description of a typical form and application of the invention, throughout which description reference is had to the accompanying drawing, in which:

Fig. 1 is a fragmentary view of a portion of a typical automotive vehicle illustrating the transmission and drive shaft and showing a portion of the transmission housing broken away so that a portion of its internal mechanism is seen in elevation. Fig. 2 is an enlarged vertical detailed sectional view of the back-stop provided by the present invention, being a view taken as indicated by line 2—2 on Fig. 1. Fig. 3 is a vertical detailed sectional view taken substantially as indicated by line 3—3 on Fig. 2. Fig. 4 is an enlarged side elevation of the manual control means embodied in the present invention. Fig. 5 is a fragmentary detailed sectional view taken as indicated by line 5—5 on Fig. 2, and Fig. 6 is a detailed sectional view, being a view taken substantially as indicated by line 6—6 on Fig. 2.

The device provided by this invention is capable of embodiment in forms for use on various types and makes of automobiles, trucks, motorcycles, etc. Throughout the following detailed description the invention will be disclosed in a simple form and in connection with or applied to the drive and transmission mechanism of a typical automotive vehicle. It is to be understood that the invention is not to be taken as restricted to the particular embodiment or application of the invention about to be described, but that it is to be taken as including any features or modifications that may fall within the scope of the claims.

The portion of the typical automotive vehicle illustrated in the drawing includes a transmission housing 10, a clutch case 11 at forward end of the housing and case. A drive shaft 13 extends through and projects rearwardly from the transmission housing 10, and a gear 14 is mounted on or associated with the shaft 13 within the housing 10. A horizontal shaft 15 is arranged above the gear 14 and slidably carries a reverse pinion or reverse gear 16 slidable into mesh with the gear 14. A sliding countershaft 17 is arranged above the shaft 15 and carries a shifting fork 18 for slidably operating the gear 16 along the shaft 15. A control lever or gear shift lever 19 projects upwardly from the floor 12 and is operatively connected with the sliding shaft 17. A pedal 20 is shown for controlling the clutch mechanism of the vehicle, and an operator's seat 21 is illustrated at the rear of the floor 12. The portion of the vehicle illustrated in the drawing includes various other parts common to vehicles of this general class.

The hold-back or back-stop provided by this invention includes, generally, a body or housing 22 adapted to be stationarily mounted around the drive shaft 13, a brake means within the housing 22 including a rotor 23 fixed on the drive shaft 13, and a plurality of weighted levers 24 carried by the rotor to co-operate with the housing 22, an automatic control 25 for the brake means whereby the levers 24 are automatically released or made inoperative upon shifting of the reverse gear 16 into mesh with the gear 14, and a manual control 26 for the brake means for manually releasing the levers 24.

The housing 22 is the stationary element of the device and surrounds the drive shaft 13. The housing 22 is preferably of round cross sectional configuration and is hollow to carry the rotor 23, the levers 24, etc. What I will term the outer end of the housing 22 is closed by an end wall 27, while the inner end of the housing is closed by an end plate 28. The plate 28 may be attached to the inner end of the housing by suitable screws 29. The opening 30 of the housing is of round cross section and its peripheral wall 31 is curved concentrically about the axis of rotation of the shaft 13 and is in the nature of a race for engagement by or cooperation with the weighted levers 24. In the application of the invention illustrated in the drawing the housing 22 is attached to the rear end of the transmission housing 10. Suitable studs 32 may be employed to secure the housing 22 to the rear end of the transmission housing 10.

The rotor 23 is mounted on the drive shaft 13 within the opening 30 and is provided to carry the weights or levers 24. The rotor 23 is annular to surround the shaft 13 and is connected with the shaft by keys 33. In the preferred construction the rotor 23 is mounted on the shaft 13 adjacent the outer end wall 27 of the housing.

The weighted levers 24 are attached to the rotor 23 and are provided to cooperate with the race 31 of the housing to prevent undesired rotation of the shaft 13 in the reverse direction. In accordance with the invention, the weighted levers 24 are controlled or acted upon by centrifugal force and gravity and their operation is controllable by the means 25 and 26. There are a plurality of the levers 24 symmetrically or equally spaced about the rotor 23. In the particular case illustrated in the drawing there are four equally-spaced levers 24. The levers 24 are alike in size and shape and are arcuate in their general configuration, having curved outer and inner sides. The levers 24 are pivotally attached to the rotor 23 in like manners. In accordance with the invention, the levers 24 are pivotally connected to the rotor 23 at points adjacent their rear ends relative to the forward direction of rotation of the shaft 13 so as to have their centers of gravity or their centers of greatest mass spaced forwardly from their points of pivotal connection with the rotor.

In the construction illustrated in the drawing a slot or opening 34 is provided in the inner side of each lever 24 at its rear end to receive a lug 35 projecting radially from the rotor 23. Axially-extending pivot pins 36 extend through openings 37 in the levers and opening 38 in the lugs 35 to pivotally connect the levers 24 with the rotor. The pivot pins 36 are preferably rigidly connected with the rotor 23, for example, they may be force-fitted into the openings 38. The pivot pins 36 project inwardly beyond the levers 24 for the purpose to be hereinafter described. In practice, rounded enlargements 39 are provided around the openings 37 to project from the rear ends of the levers. The rear ends 40 of the levers 24 are preferably flat and substantially radial relative to the pivotal axes of the levers. A finger 41 projects outwardly from each lever 24 at or adjacent its rear end. The fingers 41 project slightly rearward of the pivotal axes of the levers with respect to the direction of forward rotation of the drive shaft 13. The fingers 41 are provided to engage the race 31 of the housing and their outer ends are finished to effectively cooperate with the race, for example, they may be slightly curved to conform to the curvature of the race. The outer ends or faces of the fingers 41 join the rear ends 40 of the levers in comparatively sharp edges.

The weighted levers 24 are acted upon by centrifugal force during the forward rotation of the shaft 13 and are acted upon by gravity when the shaft 13 is stationary. When the shaft 13 is rotating in a forward direction, centrifugal force acts on the heavy forward ends of the levers to hold them outwardly so that the fingers 41 are held out of engagement with the race. Upon the speed of rotation of the shaft 13 in a forward direction being reduced, the forward ends of the levers 24 fall or move inwardly toward the rotor 23 and, when rotation of the shaft 13 almost ceases, gravity acts to bring one or more of the levers in positions where their fingers 41 press against or pressurally engage the race 31. Gravity acts upon the lever or levers 24 above the axis of rotation of the mechanism to hold them in a position where their fingers 41 engage the race 31 when the shaft is stationary.

Spring means is provided to bring the levers 24 that stop in positions below the axis of rotation of the mechanism into positions where their fingers 41 engage the stationary race 31. An arm 42 projects outwardly from each lug 35 at a point rearwardly of the adjacent weighted levers 24. A pin 43 projects forwardly from each arm 42 to extend into an opening 44 at the rear end of a lever 24. A spring 45 is arranged in each opening 44. The springs 44 are arranged under compression between the bottom of the openings 44 and heads or washers on the ends of the pins 43. The springs 45 normally urge the weights to "in" positions, i. e., to positions where their forward parts of the greatest mass lie inwardly toward the rotor 23 and their fingers 41 engage the race 31. The springs 44 operate to hold the levers 24 that occur below the axis of rotation of the shaft in positions where their fingers 41 are in pressural engagement with the race 31. Further, the springs 45, the pins 43, and the arms 42 constitute a stop means which positively prevents centrifugal force from moving the weighted levers to positions where their forward ends might engage the race 31. It will be apparent that the fingers 41 in pressurally engaging the race 31 positively prevent rotation of the shaft 13 in a rearward or reverse direction. The rear edges of the fingers 41, being sharp or at substantially normal angles, ensure effective engagement of the fingers with the race 31.

The automatic control means 25 operates to interconnect the weighted brake levers 24 with the reverse gear 16 so that operation of the reverse gear into mesh with the gear 14 moves and holds the weighted levers 24 in positions where their fingers 41 are held out of engagement with the race 31. The control means 25 includes a shiftable release sleeve 47 within the opening 30. The sleeve 47 is connected with the rotor 24 to rotate therewith. The sleeve 47 is disposed between the inner end of the rotor 23 and the opening 47ª in the sleeve passes the shaft 13 with considerable clearance. The end plate 28 and the projecting ends of the pivot pins 36 are slidable in axial openings 48 in the sleeve 47. The sleeve 47 rotates with the shaft 13 and rotor 23 and is slidable on the pins 36 toward and away from the inner end of the rotor.

Release fingers or wedge fingers 48ª project from the sleeve 47 to shift and hold the weighted levers 24 in positions where their fingers 41 are free of the race 31. A release finger 48ª is provided on the sleeve 47 to cooperate with each lever 24. In accordance with the invention, the fingers 48ª are adapted to engage the under or inner sides of the levers 24 at points adjacent their forward ends. The fingers 48ª are arcuate and their inner sides are curved to slidably engage the periphery of the rotor 23. The outer sides of the fingers 48ª are inclined outwardly toward the sleeve 47 so that they force the forward weighted ends of the levers 24 outwardly when the sleeve 47 is moved toward the rotor 23. The sleeve 47 is normally in a position adjacent the plate 28 where the fingers 48ª are out of operative engagement with the weighted levers 28.

An operative connection is provided between the release sleeve 47 and the sliding countershaft 17 so that movement of the shaft 17 in a rearward direction to bring the gear 16 into mesh with the gear 14 causes the sleeve 47 to move rearwardly toward the rotor 23. In the preferred embodiment of the invention, the slide shaft 17 projects rearwardly beyond the rear end of the transmission housing 10. A head or sleeve 49 slidably passes the projecting rear end of the slide shaft 17. The head 49 is provided with a downwardly-projecting lug 50. A shiftable fork 51 cooperates with an annular groove 52 in the periphery of the release sleeve 17. A rearwardly-projecting arm 53 is provided at the upper end of the fork 51. The arm 53 may pass rearwardly through an opening 54 in an enlargement 55 on the housing 22. An adjustable connection 56 is provided between the arm 53 and the downwardly-projecting lug 50. A pin 57 projects from the slide shaft 17 to engage the head 49 after the slide shaft 17 has been moved rearwardly a predetermined amount to cause rearward movement of the fork 51 and release sleeve 47 to force the weighted ends of the levers 24 outwardly. Spring means is provided to return the head 49, the fork 51, and the sleeve 47 to their normal inoperative positions upon disengagement of the gear 16 from the gear 14. A helical spring 58 is arranged under tension between the head 49 and the transmission housing 10 to return the head, the fork 51, and the release sleeve 47 to the normal inoperative positions upon forward movement of the slide shaft 17.

The manual control means 26 for releasing or making the brake means inoperative is adapted to be controlled by the operator of the vehicle. The manual control means 26 includes a lever 60 pivotally mounted intermediate its ends on a bracket 61 projecting rearwardly from the transmission housing 10. The lower end of the lever 60 is yoked and passes over the head 49. Pins 62 project from the head 49 to slidably operate in slots 63 in the yoked lower end of the lever to operatively connect the lever 60 and the head. The lever 60 extends upwardly through an opening 64 in the floor 12 and its upper end part is in the nature of a foot pedal 65. The pedal or upper end part 65 of the lever 60 extends forwardly and substantially horizontally from the opening 64 to be readily accessible to the operator. Upon the pedal 65 being depressed, the head 49 is shifted rearwardly so that the release sleeve 47 is moved toward the rotor 23 to shift the levers 24 to the inoperative positions. A releasable spring clip or latch 66 is provided to releasably hold the pedal 65 in the down position where the weighted levers 24 are maintained in the inoperative positions. The latch 66 is adapted to engage the upper side of the pedal 65 to hold the pedal in the down position.

It is believed that the utility and operation of the hold-back or back-stop provided by the present invention will be readily apparent from the foregoing detailed description. During rotation of the drive shaft 13 in a forward direction, the forward weighted ends of the levers 24 are held outwardly by centrifugal force in positions where the brake fingers 41 are spaced from and free of the race 31. Assuming that the gear 16 is out of engagement with the gear 14 and that the pedal 65 is in the up position, the fingers 41 automatically engage the race 31 upon forward rotation of the drive shaft 13 stopping. When the drive shaft 13 stops rotating in a forward direction, gravity acts upon certain of the levers 24 to bring them to positions where the fingers 41 pressurally engage the stationary race 31. The springs 45 act upon the remaining weighted levers 24 to bring them to positions where their fingers 41 cooperate with the race 31. It will be apparent that the springs 45 aid the force of gravity which would normally bring one or more of the weighted levers into the braking position and counteract and overcome the force of gravity which would normally hold the other levers in the inoperative position. The spring means ensures a more perfect and smooth operation of the mechanism. When the shaft 13 is again rotated in a forward direction to drive the vehicle forward, centrifugal force acts upon the weighted forward ends of the levers 24 to bring the levers to out positions where the fingers 41 are disengaged from the race 31. The fingers 41 are instantly released from the race 31 when the shaft 13 is rotated in a forward direction. The arms 42 positively prevent the levers 24 from assuming an extreme out position where their forward ends might engage the race 31 when the shaft 13 is rotated at high speeds in a forward direction. It will be apparent that the fingers 41 simultaneously and instantly come into braking or pressural engagement with the race 31 upon the vehicle being stopped, or more properly upon the forward rotation of the drive shaft being stopped, so that the vehicle is positively held against rearward movement in the event that it is stopped or standing upon an inclination.

When the vehicle is to be operated backwards or in a rearward direction by its motive power, the gear shift lever 19 is operated to shift the shaft 17 rearwardly and bring the reverse gear 17 into mesh with the gear 14. Rearward movement of the sliding countershaft 17 brings the pin 57 into engagement with the head 49 and causes the head 49 to be moved rearwardly. Rearward movement of the head 49 shifts the release sleeve 47 toward the rotor 23 so that the release fingers 48 move under the weighted ends of the levers 24 to move the levers 24 to positions where their brake fingers 41 are free of the race 31. It will be apparent that the release sleeve 47 remains in the operative position where the fingers 41 are out of engagement with the race 31 as long as the gear 16 is in mesh with the gear 14 and, accordingly, as long as the vehicle is being operated in a backward direction. When the gear 16 is shifted forwardly out of mesh with the gear 14, the pin 57 moves out of engagement with the head 14 and the spring 58 operates to return the head, the fork 51, and the release sleeve 47 to their normal inoperative position. The control means 25 positively releases the back-stop so that the fingers 41 cannot engage the race 31 when the vehicle is to be operated in a backward direction.

The manual control means 26 provides means whereby the levers 24 may be maintained in an inoperative position where their fingers 41 are out of engagement with the race 31. When it is desired to release the back-stop or render the back-stop inoperative, the pedal 65 may be depressed to cause rearward movement of the head 49 and corresponding movement of the fork 51 and release sleeve 47. The latch 66 acts to releasably hold the pedal 65 in the down position where the back-stop is released. The manual control means 26 may be readily released to put the back-stop in an operable condition by releasing the latch 66 so that the spring 58 moves the head 49 forwardly to return the lever 60 to its normal position and the release sleeve 47 to its normal inoperative position.

It is to be noted that the present invention provides a hold-back or back-stop that is operable to positively prevent undesired rearward movement of a vehicle when standing on an incline. Upon the vehicle being stopped, the brake fingers 41 simultaneously and instantly come into braking or pressural engagement with the race 31 to hold the rotor and shaft 13 against rotation in a rearward or reverse direction. The fingers 41 are positioned and shaped to co-operate with the race 31 to effectively prevent reverse rotation of the shaft 13. As the fingers 41 automatically come into co-operation with the race 31 upon the stopping of rotation of the shaft 13 in a forward direction, the vehicle is prevented from moving rearwardly and, accordingly, the shaft 13 is prevented from rotating in a reverse direction. The fingers 41 being equally spaced and operating simultaneously to engage the race 31 when the shaft 13 ceases rotation in a forward direction, there is no tendency for chattering action, jars, or shocks to the parts. The weighted levers 24 are formed and mounted so that the fingers 41 release from the race 31 immediately upon rotation of the shaft 13 in a forward direction so that the fingers 41 cannot bind with or jam against the race 31. The present invention provides a simple, inexpensive back-stop that dependably holds an automotive vehicle against backward or rearward movement when standing on an inclination without the necessity of employing the brake mechanism of the vehicle. The means 25 ensures the release of the back-stop upon operation of the vehicle in a reverse direction by its motive power, while the manual control means 26 permits the device to be made inoperative when desired.

Having described only a typical preferred form of my invention, I do not wish to limit myself to the specific details set forth, but wish to reserve to myself any changes or variations that may appear to those skilled in the art or fall within the scope of the following claims:

Having described my invention, I claim:

1. A device of the character described including a housing adapted to be stationarily mounted around a drive shaft of a vehicle, a rotor to be mounted on the shaft in the housing, a plurality of levers pivoted to the rotor, a finger on each lever adapted to engage the housing to hold the shaft against rotation in a reverse direction, the levers having their centers of greatest mass related to their pivotal axes so that rotation of the shaft in a forward direction causes centrifugal force to hold the levers in positions where their fingers are free of the housing and so that gravity acts to hold one or more of the levers in positions where their fingers engage the housing when the shaft is stationary, a sleeve in the housing shiftable to a position where it holds the levers where their fingers are free of the housing, automatic control means for the sleeve, and manual means for shifting the sleeve.

2. A device of the character described for use in connection with a drive shaft and reversible transmission for controlling the operation of the shaft which includes a housing to be stationarily mounted around the shaft, a rotor on the shaft in the housing, brake levers pivoted to the rotor and operable to engage the housing to hold the shaft against rotation in a reverse direction, a shiftable sleeve operable to a position where it holds the levers in an inoperative position, and a control means for the sleeve, including a fork for shifting the sleeve, manual means for shifting the sleeve, and an operative connection between the sleeve and a shiftable part of the reverse mechanism of the transmission.

In witness that I claim the foregoing I have hereunto subscribed my name this 16th day of March, 1931.

LEO C. WILLEY.